April 19, 1966 T. G. BRASHEAR, JR 3,246,725
CLUTCH AND/OR BRAKE TYPE COUPLING
Filed Sept. 3, 1963 4 Sheets-Sheet 2

INVENTOR.
TURNER G. BRASHEAR, JR.
BY
Bruce & Brosler
HIS ATTORNEYS

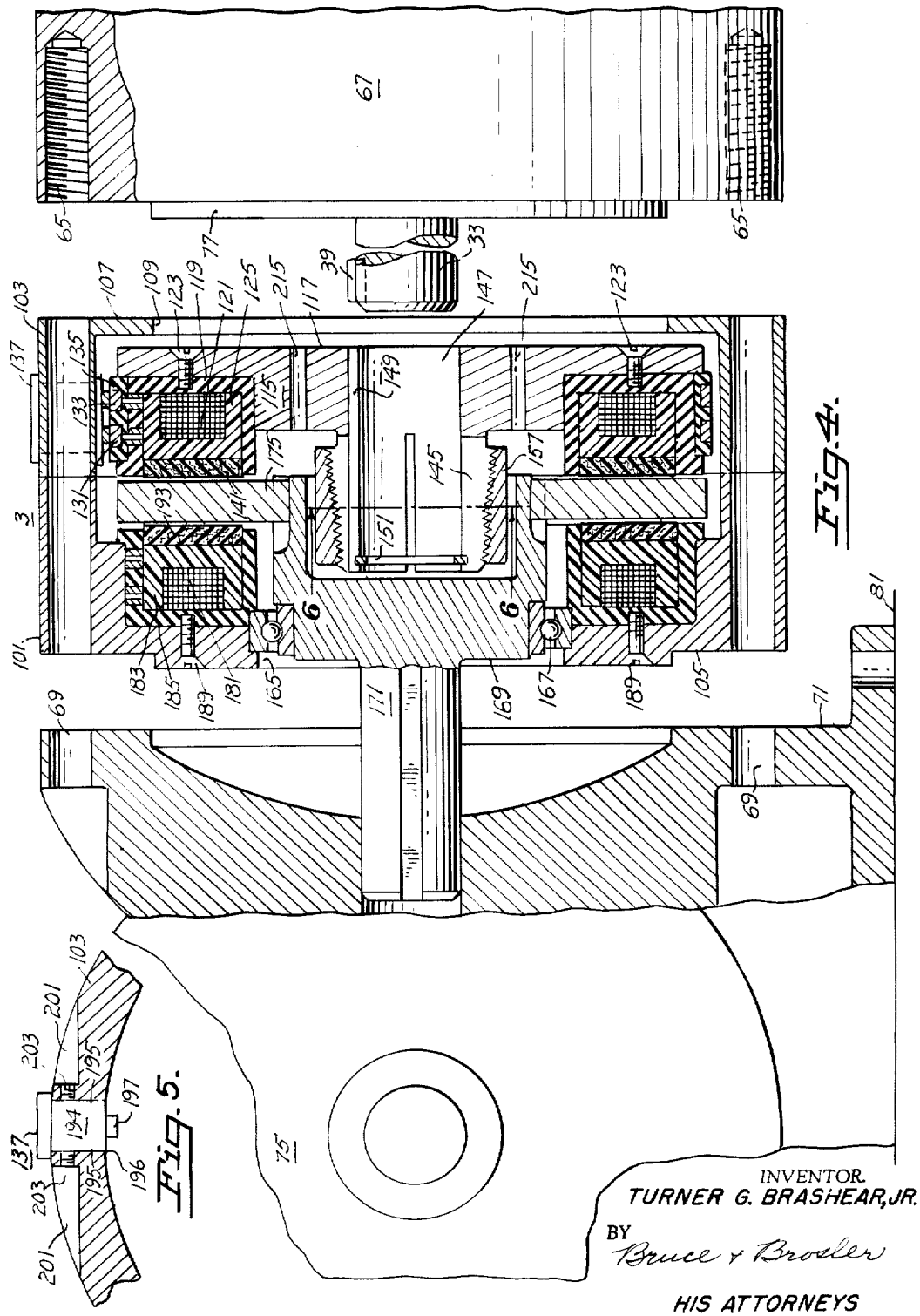

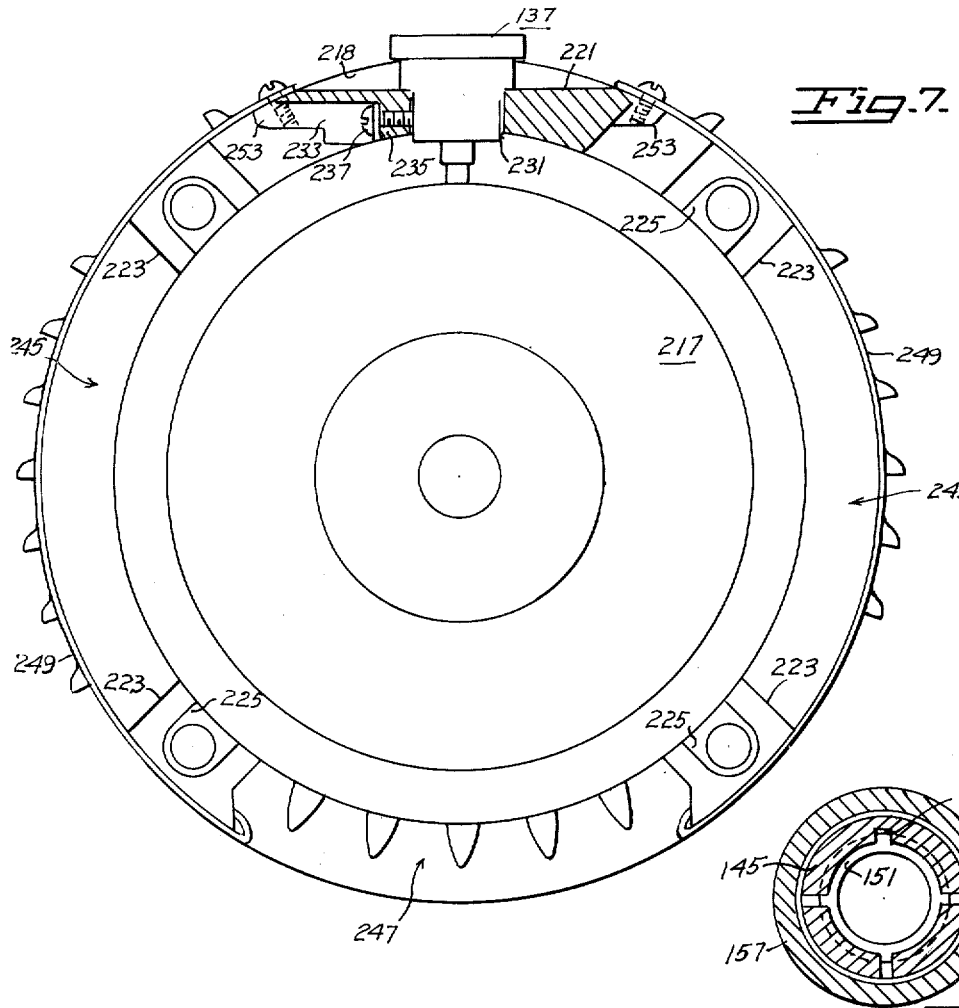

United States Patent Office 3,246,725
Patented Apr. 19, 1966

3,246,725
CLUTCH AND/OR BRAKE TYPE COUPLING
Turner G. Brashear, Jr., El Cerrito, Calif., assignor, by mesne assignments, to United Electrodynamics, Inc., Pasadena, Calif., a corporation of California
Filed Sept. 3, 1963, Ser. No. 306,370
7 Claims. (Cl. 192—18)

This application is a continuation-in-part of my application for Clutch or Brake Type Coupling, S.N. 250,043, filed January 8, 1963, now abandoned.

My invention relates to couplings and more particularly to couplings of the type including a mechanism, such as a clutch, brake or the like.

Couplings of the above character are conventionally installed between a motor and apparatus or load to be driven by such motor. The couplings, if it includes clutch mechanism, permits of the application to disconnection of power from the motor to the controlled apparatus. If the coupling includes a brake, then it permits of the application of a braking force in slowing down or stopping the controlled apparatus. In some couplings, both clutch and brake mechanism may be included.

In currently available coupling equipment of this character, the coupling must be accurately aligned with both the drive motor and the driven apparatus before the coupling may be permanently secured, and the securing of the same may necessitate in some cases, machine operations including the drilling and tapping of machine screw mounting holes in the casings of the motor and controlled apparatus in which to anchor suitable mounting brackets for supporting the coupling, and in other instances, requires that a user machine his motor housing to accept the coupling.

Among the objects of my invention are:

(1) To provide novel and improved coupling means of the type including a mechanism such as a clutch, brake or the like;

(2) To provide novel and improved clutch or brake coupling means adapted for installation between a motor and controlled apparatus, which coupling means permits of installation without the problem of aligning the coupling means with the motor and the apparatus to be controlled;

(3) To provide novel and improved clutch or brake coupling means adapted for installation in a very simple and positive manner;

(4) To provide novel and improved clutch or brake coupling means adapted for connection in tandem between apparatus to be coupled;

(5) To provide novel and improved clutch or brake coupling means of light weight but rugged in construction.

(6) To provide a novel and improved clutch-brake assembly in a common housing;

(7) To provide a novel and improved coupling including clutch and/or brake means in a standardized coupling housing adapted for use without change, between a C-flange type motor housing and apparatus to be driven by the motor, and (8) To provide a novel and improved method of forming a pair of slip rings applicable to the foregoing clutch means.

Additional objects of my invention will be brought out in the following description of a preferred embodiment of the same, taken in conjunction with the accompanying drawings, wherein:

FIGURE 4 is a view in section through a coupling of the present invention wherein both clutch and braking mechanism are so inter-related as to permit of both being included in a common housing;

FIGURE 5 is a fragmentary view depicting a brush assembly as installed in the housing of FIGURE 4;

FIGURE 6 is a view in section, taken in the plane 6—6 of FIGURE 4;

FIGURE 7 is a view depicting a desirable modified form of coupling housing;

FIGURE 8 is a view in section depicting a method of fabricating a component portion of the assembly of FIGURE 4.

Figure 1:
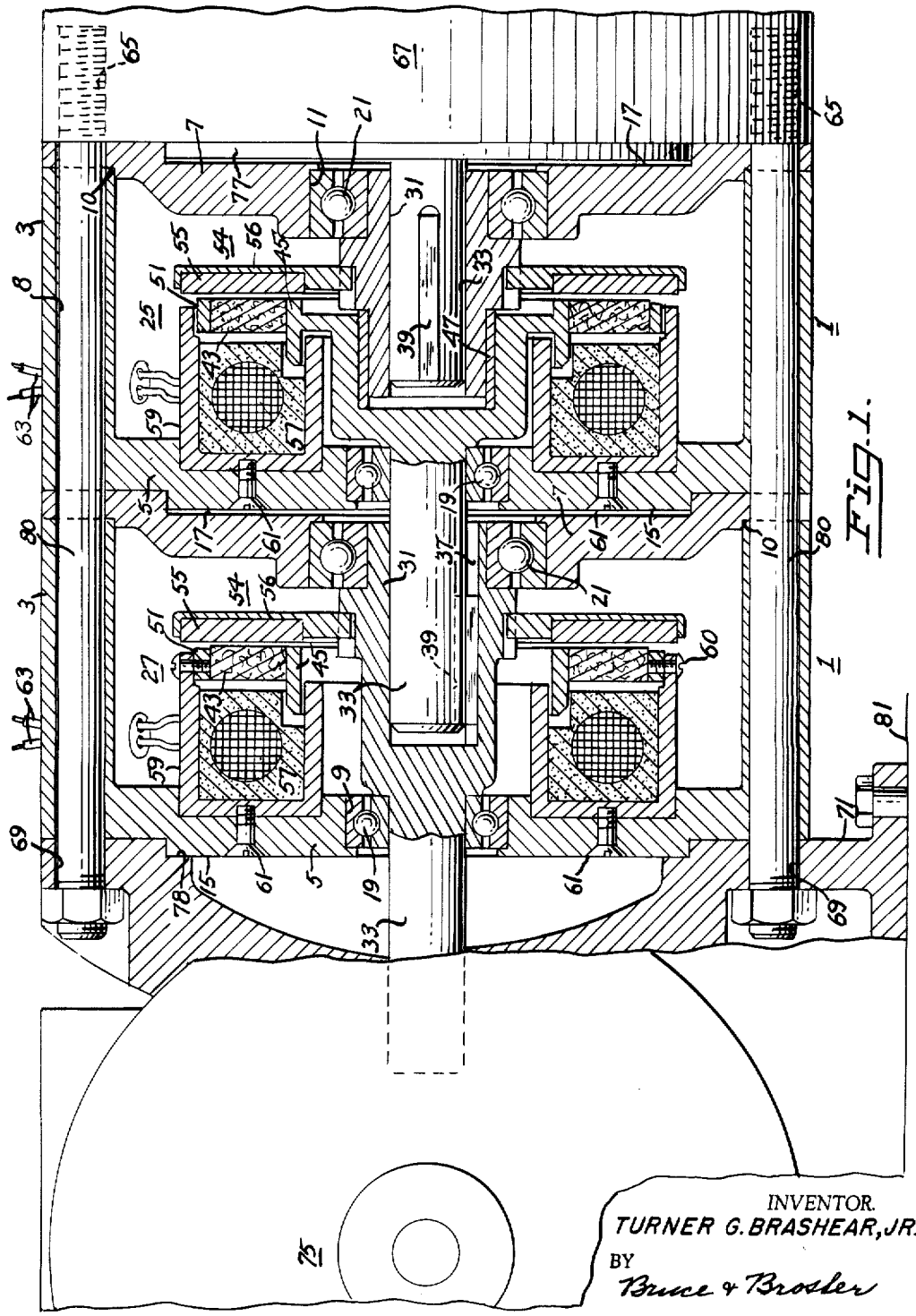
FIGURE 1 is a view partially in section through a brake coupling and a clutch coupling of the present invention employed in tandem in one type of installation.

Referring to the drawings for details of my invention, and more particularly FIGURE 1 thereof, the coupling means 1 involves a housing having an integral end wall 5 and a closure end wall 7, and a plurality of peripherally spaced mounting bolt holes or passages 18, with the end walls provided with aligned bearing openings 9 and 11.

The integral end wall 5 is formed with an external boss 15 concentric with its bearing opening 9 while the other end wall 7, which is preferably removably assembled into properly aligned position by a shoulder 10, is formed with a recess 17 concentric with its bearing opening 11, the recess being of a size adapting it to receive a boss of a size comparable to the aforementioned boss 15 on the first end wall 5. This enables two or more of such coupling housings to be aligned for installation in tandem, with all the shaft openings and mounting bolt holes properly lined up.

The end wall 5 has a bearing assembly 19 installed in its wall opening 9, while the opposing end wall 7 has a corresponding bearing assembly 21 installed in its opening 11.

Within the housing is control mechanism, which may take the form of a clutch assembly 25 or a brake assembly 27. In either event, such mechanism is partly supported in the one end wall 7 by a sleeve 31 journalled in the bearing assembly 21 of such wall, and in the other end wall 5 by a stub shaft 33 extending through such other wall and journalled in the associated bearing assembly 19. The sleeve has an internal diameter adapted to snugly receive a stub shaft of the diameter of the aforementioned stub shaft 33, while both the sleeve 31 and the stub shaft 33 are provided with key ways 37, 39 respectively.

If the mechanism within the housing is a clutch assembly 25, such assembly will include a friction rotor comprising a ring 43 of friction material such as brake lining or the like, encircling a flange 45 of magnetic material, carried on the interior end of the stub shaft 33, which end is enlarged and recessed to receive a sleeve bearing 47 in which the other end of the sleeve 31 is journalled.

About the outer periphery of the ring 43 of friction material is a ring or band 51 also of magnetic material.

The friction rotor is thus adapted to rotate with the stub shaft as a unit assembly.

Facing the friction rotor is a disk armature assembly 54 comprising a ring or segments 55 of magnetic material secured in a holder 56, which encircles the sleeve 31 on which it is slidably keyed.

The armature is thus adapted to be magnetically drawn into clutching engagement with the friction rotor ring 43 when exposed to a magnetic field generated by a field coil 57 disposed within a field case 59 of magnetic material, which encircles the enlarged interior end of the stub shaft and is fixedly secured to the proximate wall 5 of the housing 3 by screws 61. The field is adapted to be energized at will from externally of the housing, through suitable leads 63, emerging through an insulation plug in a wall of the housing.

Where the control mechanism in the coupling is a brake assembly, the structure thereof will be very similar to that of the clutch assembly previously described, except in that the stub shaft 33 and sleeve 31 will be made integral, while the friction ring 43, flange 45 and band 51, as an assembly, will be affixed to the field coil case 59 by screws 60, to remain stationary therewith. Then, upon energizing the field coil 57, the armature 55 will be drawn into engagement with the friction ring 43, which being stationary, will function to brake rotation of the armature, and consequently any apparatus coupled through the coupling.

With the mounting bolt holes or passages 13 in the coupling housing, located to coincide with standard location and spacing of threaded mounting holes 65 in the end of a motor 67 and the corresponding bolt holes 69 in the mounting bracket 71 of apparatus 75 to be driven by such motor, the installation of a coupling of the present invention becomes a very simple matter, as well as the tandem installation of two or more of such couplings, of which one may be a clutch coupling and the other a brake coupling; and this may be further facilitated by dimensioning the boss 15 and recess 17 of each coupling to match the boss 77 customarily provided on the end of the motor casing, and the complementary recess 78 formed in the mounting bracket 71. A motor housing, having a coupling end as described, is commonly designated as a C-flange motor housing.

With the motor shaft keyed within the sleeve 31 of the coupling, and the stub shaft 33 of the coupling keyed within the sleeve of an adjacent coupling, or the sleeve of apparatus to be driven, and the motor boss 77 and wall boss 15 of each coupling meshing with the proximate wall recess of an adjacent unit, the bolt passages and corresponding holes in the mounting bracket and motor can be readily lined up to receive mounting bolts 80, to bind all the units together into a unitary assembly. Thereafter, the mechanism within the coupling or couplings may be energized at will, to effect whatever control the operator may desire.

In the application of the invention depicted in FIGURE 1, the apparatus 75 to be driven, which may be a gear assembly, is base mounted for bolting to a supporting surface 81, which may be a floor or bench top, etc. When so mounted, the driven apparatus may support the drive motor and coupling units.

Figure 2:
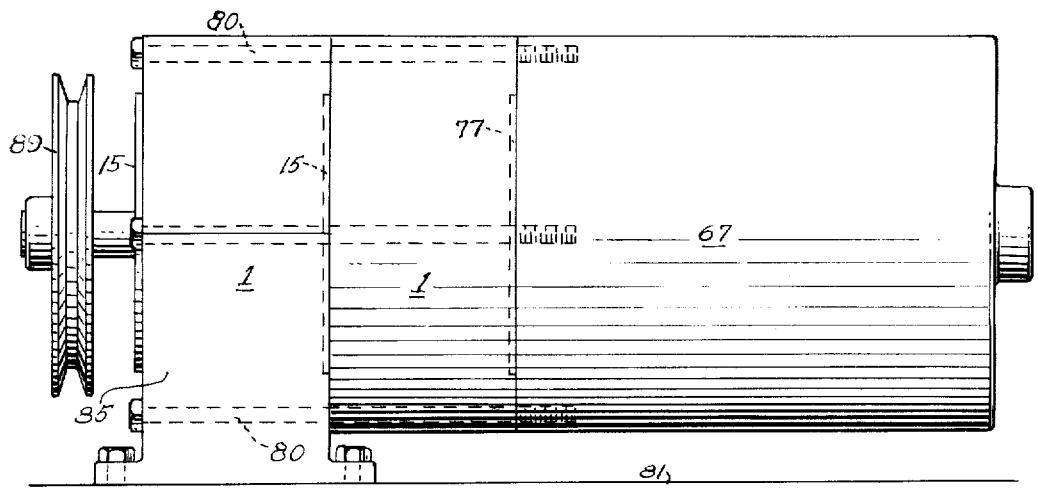
FIGURE 2 is a longitudinal view in elevation depicting a somewhat different type of installation.
Figure 3:
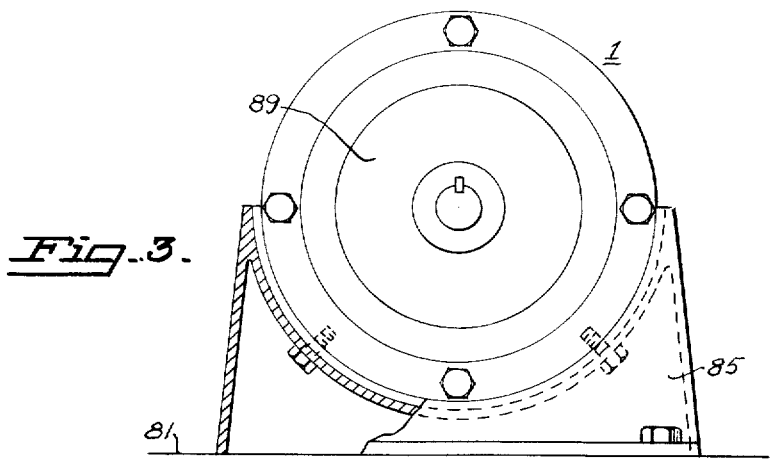
FIGURE 3 is an end view in elevation of the installation of FIGURE 2.

On the other hand, the coupling unit, or units, may be mounted on a base 85 (FIGURES 2 and 3) for bolting to a supporting surface, and when so mounted, the coupling unit or units may support both the drive motor and the apparatus to be driven. In the example illustrated, the driven apparatus is shown to be a pulley or sheave 89.

In the embodiment of the invention, as depicted in FIG. 4, the housing 3 is a sectional housing, made up of two sections 101, 103, with matching opposing edges, permitting the housing to be assembled or disassembled at will. The section 101 terminates in an end wall 105 corresponding to the end wall 5 of the housings of FIG. 1, while section 103, of the housing of FIG. 4, terminates in an end wall 107 having an enlarged opening 109 therein, corresponding in diameter to the diameter of the boss 77 on the motor housing, and adapted to snugly receive such boss to assist in properly centering the housing, when assembling the coupling to the motor.

That section 103 of the housing, facing the motor 67, will house a friction rotor 115 for the clutch mechanism, such friction rotor comprising a circular plate or disc 117 formed to provide a shoulder to receive a coil housing 119 of magnetic material, for housing a coil 121, the coil housing being affixed to the disc plate 117 by suitable screws 123.

The coil housing 119 is in the form of a circular trough in which the coil 121 is supported by filling of plastic material 125. The terminal wires of such coil are brought out through small openings provided in the coil housing and connected to a pair of slip rings 131, 133 surrounding the housing and molded into position by plastic 135. A brush assembly 137 intalled in the wall of the housing section 103 permits of electrical connection from the outside to the slip rings 131, 133 on the inside, and thence to the clutch coil 121.

The open end of the trough is closed by a ring 141 of friction material such as brake lining or the like, embedded in and held in position by the plastic material 125 surrounding the coil.

Extending inwardly from the disc plate 117 is a longitudinally split tapered hub 145, the disc plate and the hub being provided with an axial shaft passageway 147 and associated keyway 149 to permit assembly of the disc plate and hub onto the shaft of a drive motor to be keyed thereon and thus mount the clutch coil assembly for rotation with said shaft. A split ring 151 sprung into a groove within the passageway, adjacent to the inner end thereof, will act as a stop in positioning the disc plate and hub onto the motor drive shaft.

The tapered outer surface of the hub 145 is threaded to receive a complementary internally tapered nut 157 adapted to be threaded onto the hub to constrict the same and clamp the hub to the drive shaft of the motor.

The clutch rotor may thus be installed on the motor drive shaft, after its associated section 103 of the housing is first positioned onto the boss 77 of the motor casing, the split character of the coupling housing permitting of such mounting. The clutch rotor may therefore be rotated by the motor within its section of the housing, while maintaining electrical contact with the brush assembly 137 by means of the slip rings.

The end wall of the associated section 101 of the coupling housing, has an axial opening 165 to receive a bearing assembly 167, in which is journalled the enlarged end 169 of a stub shaft 171 protruding from such housing, the enlarged end of the stub shaft being recessed to extend over the hub nut 157, with clearance. This recessed portion of the enlargement is splined or otherwse contoured to slidably mount a disc armature 175 of magnetic material, and having a complementary contoured axial opening for this purpose. This places the disc armature within the magnetic influence of the clutch coil 121 whereby the armature may be pulled into engagement with the friction or brake lining material 141, to thereby magnetically couple the stub shaft 171 in drive connection with the motor 67. With a tight coupling between the disc armature 175 and the brake lining material, 141, that is, a coupling in which no slippage is permitted, a one to one drive ratio will be realized. However, by weakening the current through the clucth coil, the hold on the disc armature may be gradually weakened, whereby slippage may be permitted to take place and in gradually increasing degrees, to thereby alter the drive ratio between the motor and the drive shaft.

Within the section 101 of the coupling housing, there is mounted a brake coil 181, in all respects similar to that of the clutch coil 121, such coil being likewise supported in plastic 183 within a circular trough shaped housing 185 of magnetic material, which, in this instance, is affixed to the end wall 105 of the housing by suitable screws 189.

A ring 193 of brake material, likewise closes the open side of this trough shaped housing 185 in close proximity to the disc armature 175, whereby when the brake coil is energized, the disc armature will be magnetically attracted in pressure engagement with the brake lining.

The terminal ends of this brake coil are brought out through a pair of openings in the coil housing and through the cylindrical wall of the coupling housing for connection to a source of electrical energy.

Being that the brake coil assembly is affixed to the coupling housing and therefore cannot rotate in the manner of the clutch coil assembly, the brake coil assembly will, upon capturing the disc armature, function as a brake in bringing rotation of the stub shaft and its coupled load to a halt.

The clutch coil 121 and the brake coil 181 should be selectively energizable, each to the exclusion of the other, which can be realized simply by connecting the two coils to a source of electrical power by way of a two-way switch, whereby, upon energization of one coil, the other will be de-energized. Thus, in this embodiment of the invention, the clutch coil 121, when energized, will effect a drive connection from the motor 67 to the load 75 on the stub shaft 171, and free of any braking action. When the brake coil 181 is energized, not only will the drive connection to the load be broken due to de-energization of the clutch coil 121, but a braking action will be applied to the load, independently of the drive motor.

The wear on the brake lining 141 of the clutch coil assembly and opposing surface of the disc armature, may in time, necessitate readjustment of the clutch assembly on the shaft 33 of the drive motor, and as this will necessitate a slight shift of the slip rings 131, 133 with respect to the brush assembly 137, the brush assembly is preferably mounted in the wall of the coupling housing, in a manner which will permit of a slight longitudinal adjustment thereof, to bring the brush elements thereof back into alignment with the slip rings.

In FIGURE 5 of the drawings, is depicted one form of brush assembly and mounting which will permit of such adjustment. Referring to this figure, it is noted that the brush assembly comprises the flanged block 194 of insulation material, having a pair of flat, parallel walls 195 to enable the same to slidably fit in a slot 196 formed in the coupling housing at a location which will expose to view, the slip rings 131, 133. The block is adapted to receive and removably hold in any conventional manner, a pair of spring biased carbon or like brushes 197.

To either side of the housing slot, is an outside recess 201 in the housing wall, at which location, a threaded hole to the slot wall is provided to receive a set screw 203. Such set screws may be relied on to engage and retain the brush holder assembly in any adjusted position within the limited range of adjustment demanded by the wear on the clutch lining and disc armature.

Heat which might otherwise accumulate within the coupling housing, due to sliding friction between the armature 175 and friction lining 141, and during braking, may be released therefrom through a plurality of vent openings 215 in the disc plate; but, where the problem is of some magnitude, a specially designed ventilated housing 217, as depicted in FIGURE 7 of the drawings, may be relied on.

This housing, as illustrated, comprises a frame including an end wall 218 similar to end wall 105 of FIG. 4, but with an integral longitudinal wall section 221 and circumferentially spaced bars 223 formed with inwardly facing channels 225, the free ends of the wall section 221 and channel bars 225 being supported by an independent wall similar to the end wall 107 of FIGURE 4.

The longitudinal wall section 221 provides for the adjustable installation of the brush assembly 137, by being provided with a slot 231 to slidably receive the brush assembly, and an undercut or recess 233 to create an adjacent wall 235 for a screw 237 with which to lock the brush assembly in any of its permissible adjustable positions.

The channel bars 225 are so located as to leave side openings 245 a bottom opening 247 in the frame. The side openings may each be closed in by a louvered wall section or cover 249, formed of sheet metal or other sheet material, and at its lower end, adapted to hook in under one of the channel bars, which is preferably tapered along the proximate edge for such purpose.

At its upper end, the louvered section or cover is adapted to be anchored to the proximate edge of the longitudinal wall section 221, which is formed with integral lugs 253 for this purpose. When these louvered wall sections or covers are installed, bottom opening 247 will remain open, to permit of the influx of cooling air to supplant heated air which may have escaped from within the housing through the louvered wall sections.

When employing the louvered type housing of FIGURE 7, the clutch and/or brake assembly are assembled through the open end of the frame, following which the end wall corresponding to the end wall 107 of FIG. 4, is added and the louvered wall sections then installed. The overall assembly is then ready for installation between the drive motor 67 and a driven load 75, through the use of mounting bolts in the manner previously described in connection with the embodiments of FIGURES 1 through 4.

A feature of the present invention resides in the manner of fabrication of the clutch coil assembly including the associated slip rings 131, 133 employed in the clutch assembly. Such clutch coil assembly is prepared for installation as a unit, and in so doing, the trough housing 119 for the coil is positioned horizontally in a shallow cylindrical container 228 of sufficiently excess diameter to snugly receive a ring 229 having an internal peripheral groove to form spaced inside circular ribs 231, 233. The coil 121 is positioned in its circular trough housing with its terminal leads extending through openings 235 in the outer wall of the coil housing and connecting to the ribs of the ring 229.

With the coil 121 and ring 229 thus positioned and electrically connected, a plastic, such as red-epoxy, mixed with a catalyzer, is poured into the trough and container in an amount sufficient to cover the coil and fill in around the coil leads and exposed portions of the ring. The assembly is then de-gasified in a vacuum, which causes the liquid plastic to fill in all voids, following which and before solidification takes place, the ring 141 of brake or friction lining is pressed into position and partially embedded in the plastic to become bonded thereto upon solidification thereof.

Following solidification of the plastic, the clutch coil assembly is removed from the shallow container 228 and placed in a lathe or equivalent machine, and the ring 229 turned down until the portion which bridges the ribs 231 and 233 is completely removed, thereby leaving only the spaced ribs, to function as slip rings.

From the foregoing description of my invention, it will be apparent that the same fulfills all the objects thereof, and while I have illustrated and described the same in more than one form and in considerable detail, it will become apparent that the same is subject to additional alteration and modification without departing from the underlying principles involved, and I, accordingly, do not desire to be limited in my protection to the specific details illustrated and described except as may be necessitated by the appended claims.

I claim:

1. Coupling means inclusive of a mechanism such as a clutch, for installation between a motor including a housing having an end boss surrounding the motor drive shaft, and mounting bolt holes about said boss, and driven apparatus having a mounting end provided with a recess complementary to such boss and corresponding mounting bolt holes about said recess, said coupling means comprising a housing having end walls, one of said end walls being adapted to complementally receive the boss of such motor and permit passage of such motor drive shaft into said housing, the other of said end walls having a boss adapted to complementally fit the recess in the mounting end of such driven apparatus, a stub shaft, bearing means secured within said last named wall and rotatably supporting said stub shaft; the boss in the other of said end walls, recess, and stub shaft being concentrically aligned with respect to each other, said stub shaft adapted for drive connection to such driven apparatus, said coupling housing having mounting bolt passages corresponding to and adapted to match the mounting bolt holes in such motor and such driven apparatus, and coupling mechanism within said coupling housing, said coupling mechanism comprising a clutch coil assembly means, including a circular trough coil housing, a clutch coil supported in said coil housing, armature means in association with said clutch coil assembly means, means for mounting one of said associated means on such motor drive shaft, means for mounting the other of said associated means on said stub shaft, said armature means being slidably mounted on its shaft to enable the same to be drawn into clutching engagement with its associated clutch coil assembly upon energization of the clutch coil of said assembly, to effect a drive connection from such motor to said stub shaft, and means extending through the wall of said coupling housing for enabling electrical energization of said clutch coil from externally of said housing.

2. Coupling means as in claim 1 in which said coil assembly is mounted on the drive shaft of such motor for rotation therewith and which the means for mounting said drive shaft includes a disc plate having means for attachment of said coil assembly to said disc plate, a hub extending inwardly from said disc plate, an axial passageway extending through said disc plate and hub to receive the drive shaft of such motor, means cooperating with said hub for retaining the same and its associated assembly to the motor drive shaft.

3. Coupling means inclusive of a mechanism such as a clutch or the like, for installation between a motor and driven apparatus, comprising a housing having end walls, one of said end walls being adapted to permit passage of the drive shaft of such motor into said housing, and coupling mechanism within said coupling housing, said coupling mechanism comprising a clutch coil assembly including a clutch coil, and a pair of slip rings encircling said coil and electrically connected to the terminal ends of said coil, means for mounting said clutch coil assembly on the drive shaft of such motor for rotation therewith, said means including, a disc plate having a circular shoulder to receive said clutch coil assembly for attachment to said disc plate, a tapered hub extending inwardly from said disc plate, an axial passageway extending through said disc plate and hub to receive the drive shaft of such motor, said tapered hub being split longitudinally and having a thread along its tapered surface, a complementary tapered nut threadedly securable on said hub to compress said hub into locking pressure engagement with such motor drive shaft, a shaft rotatably mounted axially of said other coupling housing end wall, a disc armature slidably spliced to said rotatably mounted shaft in operative association with said clutch coil assembly, whereby upon energization of said clutch coil, said coupling will function as a clutch drive between such motor and said rotatably mounted shaft and any apparatus connected thereto.

4. Coupling means inclusive of a mechanism such as a clutch or the like, for installation between a motor including a housing having an end boss surrounding the motor drive shaft, and mounting bolt holes about said boss, and driven apparatus having a mounting end provided with a recess complementary to such boss and corresponding mounting bolt holes about said recess, said coupling means comprising a housing having end walls, one of said end walls being adapted to complementally receive the boss of such motor and permit passage of such motor drive shaft into said housing, the other of said end walls having a boss adapted to complementally fit the recess in the mounting end of such driven apparatus, said coupling housing having mounting bolt passages corresponding to and adapted to match the mounting bolt holes in such motor and such driven apparatus, and coupling mechanism within said coupling housing, said coupling mechanism comprising a clutch coil assembly including a circular trough coil housing, a clutch coil supported in said coil housing, a ring of friction material closing the open side of said trough housing, and a pair of slip rings encircling the outer wall of said trough housing and electrically connected to the terminal ends of said clutch coil, means for mounting said clutch coil assembly on such motor drive shaft for rotation therewith, said means including, a disc plate having a circular shoulder to receive said clutch coil assembly for attachment to said disc plate, a tapered hub extending inwardly from said disc plate, an axial passageway extending through said disc plate and hub to receive the drive shaft of such motor, said tapered hub being split longitudinally and having a thread along its tapered surface, a complementary tapered nut threadedly securable on said hub to compress said hub into locking pressure engagement with such motor drive shaft, a shaft rotatably mounted axially of said other coupling housing end wall, and a disc armature slidably spliced to said rotatably mounted shaft, whereby upon energization of said clutch coil, said coupling will function as a clutch drive between such motor and said rotatably mounted shaft and any apparatus connected thereto.

5. Coupling means inclusive of a mechanism such as a clutch, brake or the like, and for installation between a motor including a housing having mounting bolt holes, and driven apparatus having corresponding mounting bolt holes, said coupling means comprising a housing having end walls, one of said end walls being adapted to permit passage of the drive shaft of such motor into said housing, said coupling housing having mounting bolt passages corresponding to and adapted to match the mounting bolt holes in such motor and such driven apparatus, and coupling mechanism within said coupling housing,
said coupling mechanism comprising
a clutch coil assembly including
a circular coil housing,
a clutch coil supported in said coil housing, and
a pair of slip rings encircling the outer wall of said coil housing and electrically connected to the terminal ends of said clutch coil,
means for mounting said clutch coil assembly on such motor drive shaft for rotation therewith, said means including,
a disc plate having a circular shoulder to receive said clutch coil assembly for attachment to said disc plate,
a tapered hub extending inwardly from said disc plate,
an axial passageway extending through said disc plate and hub to receive the drive shaft of such motor,
said tapered hub being split longitudinally and having a thread along its tapered surface,
a complementary tapered nut threadedly securable on said hub to compress said hub into locking pressure engagement with such motor drive shaft,
a shaft rotatably mounted axially of said other coupling housing end wall,
a brake coil assembly including
a circular trough coil housing,
a brake coil supported in said coil housing,
means fixedly securing said brake coil assembly in said coupling housing in spaced opposing relationship to said clutch coil assembly,
a disc armature being slidably mounted on said rotatably mounted shaft, whereby upon selective energization of said clutch or brake coils, said coupling may function as a clutch drive between such motor and said rotatably mounted shaft, or a brake on said rotatably mounted shaft and any apparatus connected thereto.

6. Coupling means inclusive of a mechanism such as a clutch, brake or the like, and for installation between a motor including a housing having an end boss surrounding the motor drive shaft, and mounting bolt holes about said boss, and driven apparatus having a mounting end provided with a recess complementary to such boss and corresponding mounting bolt holes about said recess,
said coupling means comprising
a housing having end walls,
one of said end walls being adapted to complementally receive the boss of such motor and permit passage of such motor drive shaft into said housing,
the other of said end walls having a boss adapted to complementally fit the recess in the mounting end of such driven apparatus,
said coupling housing having mounting bolt passages corresponding to and adapted to match the mounting bolt holes in such motor and such driven apparatus,
and coupling mechanism within said coupling housing,
said coupling mechanism comprising
a clutch coil assembly including
a circular trough coil housing,
a clutch coil supported in said coil housing,
a ring of friction material closing the open side of said trough housing, and
a pair of slip rings encircling the outer wall of said trough housing and electrically connected to the terminal ends of said clutch coil,
means for mounting said clutch coil assembly on such motor drive shaft for rotation therewith, said means including,
a disc plate having a circular shoulder to receive said clutch coil assembly for attachment to said disc plate,
a tapered hub extending inwardly from said disc plate,
an axial passageway extending through said disc plate and hub to receive the drive shaft of such motor,
said tapered hub being split longitudinally and having a thread along its tapered surface,
a complementary tapered nut threadedly securable on said hub to compress said hub into locking pressure engagement with such motor drive shaft,
a shaft rotatably mounted axially of said other coupling housing end wall,
a brake coil assembly including
a circular trough coil housing,
a brake coil supported in said coil housing, and
a ring of friction material closing the open side of said trough housing,
means fixedly securing said brake coil assembly in said coupling housing in spaced opposing relationship to said clutch coil assembly,
a disc armature disposed between said opposing coil assemblies,
said disc armature being slidably spliced to said rotatably mounted shaft whereby, upon selective energization of said clutch and brake coils, said coupling may function as a clutch drive between such motor and said rotatably mounted shaft, or a brake on said rotatably mounted shaft and any apparatus connected thereto.

7. Coupling means inclusive of a mechanism such as a clutch or brake or the like, and for installation between a motor and driven apparatus, said motor including a housing having an end boss surrounding the motor drive shaft and mounting bolt holes about said boss, said driven apparatus having a mounting end provided with a recess complementary to such boss and corresponding mounting bolt holes about said recess,
said coupling means comprising
a housing having end walls,
one of said end walls being adapted to complementally receive the boss of such motor and permit passage of said motor drive shaft into said housing,
the other of said end walls having a boss adapted to complementally fit into the recess in the mounting end of such driven apparatus, and
a stub shaft journaled for rotation in said last named end wall,
said boss recess and stub shaft concentrically aligned with respect to each other, and
said coupling housing having mounting bolt passages corresponding to and adapted to match the mounting bolt holes in such motor and such driven apparatus so that a plurality of bolts each extending through a pair of holes and passing from the motor to the driven apparatus and through a mounting bolt passage can serve to retain the motor, driven apparatus and coupling means in a unitary aligned assembly, and
a coupling mechanism within said coupling housing,
said coupling mechanism comprising
a clutch coil assembly,
means for mounting said clutch coil assembly on such motor drive shaft for rotation therewith,
said stub shaft rotatably mounted axially of the other coupling housing end wall,
a brake coil assembly,
means fixedly securing said brake coil assembly in said coupling housing in spaced opposing relationship to said clutch coil assembly,
a disc armature disposed between said opposing coil assemblies,
said disc armature being slidably mounted on said rotatably mounted stub shaft, whereby upon selected energization of said clutch or brake coil, said coupling may function as a clutch drive between such motor and said rotatably mounted stub shaft or a brake on said rotatably mounted shaft and any apparatus connected thereto.

(References on following page)

References Cited by the Examiner
UNITED STATES PATENTS

| | | | |
|---|---|---|---|
| 914,375 | 3/1909 | Ast | 192—84 |
| 1,155,124 | 9/1915 | Berger | 192—12.2 X |
| 1,828,540 | 10/1920 | Marschke | 192—18 |
| 2,037,644 | 4/1936 | Voigt | 192—18 |
| 2,098,675 | 11/1937 | Procunier | 279—42 |
| 2,348,025 | 5/1944 | Peets et al. | 192—113.1 |
| 2,380,330 | 7/1945 | Ringler | 279—42 |
| 2,581,637 | 1/1952 | Danly et al. | 192—113.1 |
| 2,946,418 | 7/1960 | Leeson | 192—18.2 |
| 2,947,394 | 8/1960 | Grover | 192—18.2 |
| 3,016,118 | 1/1962 | Zatsky | 192—18.2 |
| 3,042,998 | 7/1962 | Sweett et al. | 29—155.5 |
| 3,066,386 | 12/1962 | Filipczak | 29—155.5 |

DON A. WAITE, *Primary Examiner.*

DAVID J. WILLIAMOWSKY, *Examiner.*